(12) United States Patent
Morris et al.

(10) Patent No.: US 8,090,740 B2
(45) Date of Patent: Jan. 3, 2012

(54) SEARCH-CENTRIC HIERARCHICHAL BROWSER HISTORY

(75) Inventors: Daniel S. Morris, Bellevue, WA (US); Meredith Morris, Bellevue, WA (US); Gina Venolia, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 486 days.

(21) Appl. No.: 11/974,725

(22) Filed: Oct. 16, 2007

(65) Prior Publication Data

US 2009/0100021 A1 Apr. 16, 2009

(51) Int. Cl.
G06F 17/30 (2006.01)
(52) U.S. Cl. .................................. 707/769; 707/706
(58) Field of Classification Search .................. 707/3, 4, 707/101, 706, 769, 999.003
See application file for complete search history.

(56) References Cited

U.S. PATENT DOCUMENTS

| | | | |
|---|---|---|---|
| 6,667,751 B1 | 12/2003 | Wynn et al. | |
| 7,185,274 B1 | 2/2007 | Rubin et al. | |
| 7,225,407 B2 | 5/2007 | Sommerer et al. | |
| 7,251,775 B1 | 7/2007 | Astala et al. | |
| 2003/0046281 A1* | 3/2003 | Son | 707/6 |
| 2004/0003351 A1 | 1/2004 | Sommerer et al. | |
| 2004/0143569 A1 | 7/2004 | Gross et al. | |
| 2005/0033803 A1* | 2/2005 | Vleet et al. | 709/203 |
| 2005/0114299 A1* | 5/2005 | Bharat | 707/2 |
| 2005/0234940 A1 | 10/2005 | Apparao et al. | |
| 2006/0059135 A1* | 3/2006 | Palmon et al. | 707/3 |
| 2006/0224583 A1* | 10/2006 | Fikes et al. | 707/6 |
| 2007/0016543 A1 | 1/2007 | Epling et al. | |
| 2007/0022098 A1* | 1/2007 | Malik | 707/3 |

OTHER PUBLICATIONS

"Google Web History", https://www.google.com/accounts/ServiceLogin?hl=en&continue=http://www.google.com/psearch&nui=1 &service=hist.
"ThumbStrips 1.0.2.1", https://addons.mozilla.org/en-US/firefox/addon/5045.
Milic-Frayling, et al., "MS WebScout: Web Navigation Aid and Personal Web History Explorer", http://www2002.org/CDROM/poster/170/.
Mayer, et al., "Browsing Icons: A Task-Based Approach for a Visual Web History", pp. 1-10.

* cited by examiner

*Primary Examiner* — Thu-Nguyet Le
(74) *Attorney, Agent, or Firm* — Lyon & Harr, LLP; Katrina A. Lyon

(57) ABSTRACT

A search-centric hierarchical browser history technique that provides for the creation of a Web search history hierarchy organized according to the search queries that a user has conducted. In one embodiment, search queries occupy the highest level of the search history hierarchy and all Web sites/search results relating to a particular search query that the user accessed are hierarchically organized below that query. In another embodiment, queries may also be optionally grouped into a higher-level hierarchy that reflects search topics.

19 Claims, 8 Drawing Sheets

SEARCH-CENTRIC HIERARCHICHAL BROWSER HISTORY

BACKGROUND

Exploratory searches are multi-query searches where there is uncertainty about the space being searched and the problem that motivates the search. In conducting exploratory searches, users normally attempt to locate information in a set of search results returned in response to a query and then browse the search results to find out more information about the topic being searched.

Current Web browsers typically offer users a mechanism for viewing their Web browsing history. This history contains all of the Web pages that the user visited, typically going back a user-specified amount of time. Many browsers allow a user to sort their Web browsing history. For example, the browser may allow the Web browser history to be sorted alphabetically by Web site, chronologically in the order that the user accessed given Websites, chronologically by a given day, or alphabetically by site on a given day.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the search-centric hierarchical browser history technique provides for the creation of a search-centric web search history where Web sites that a user has accessed are hierarchically organized according to the search queries that a user has conducted. In one embodiment, search queries occupy the highest level of the search history hierarchy and all Web sites/search results relating to a particular search query that the user accessed are hierarchically organized below that query at a lower level. This search history may also include Web sites that a user linked to from within search results returned in response to the query. In another embodiment, queries may also be optionally grouped into a higher-level hierarchy that reflects search topics.

The technique can also include a user interface which in one embodiment is integrated with a typical browser. This interface may include both a browser window in which Web content is displayed and a search-centric browser history pane which displays a search-centric browser history hierarchically organized by query and optionally by topic, including user-accessed search results.

In the following description of embodiments of the disclosure reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the search-centric hierarchical browser history technique reference is made to the accompanying drawings, which form a part thereof, and which is shown by way of illustration examples by which the search-centric hierarchical browser history technique may be practiced. It is to be understood that other embodiments may be utilized and structural changes may be made without departing from the scope of the claimed subject matter.

1.0 Search-Centric Hierarchical Browser History

The search-centric hierarchical browser history technique provides for the creation of a search history hierarchically organized according to the search queries that a user has conducted. In one embodiment, search queries occupy the highest level of the search history hierarchy and all Web sites/search results relating to a particular search query that the user accessed are hierarchically organized below that query. In another embodiment, queries may also be optionally grouped into a higher-level hierarchy that reflects search topics.

The search-centric hierarchical browser history technique can be deployed in terms of a stand alone application, within a Web page or be integrated in a Web browser.

The various embodiments of the search-centric browser history technique provide for many unexpected results and advantages. For example, since a user's search history is organized by query, and optionally by search topic, it is much easier for a user to relocate information previously found in an exploratory search. Organizing an exploratory search by topic and query organizes a user's search more intuitively by task than a chronological list of various sites visited. Additionally, not only search results accessed by a user, but also sites linked to from these search results can be organized by search topic or search query, thereby providing a user with a complete history of their search organized by query. Some of the embodiments of the search-centric browser history technique allow the results of various search engines to be associated and displayed with a given search query. Additionally, in one embodiment, the search-centric browser history technique allows for the display of the search-centric browser history in one area of the display, while a Web site visited or a summary of an exploratory search topic can simultaneously be displayed.

1.1 Anatomy of a Search

Figure 1:
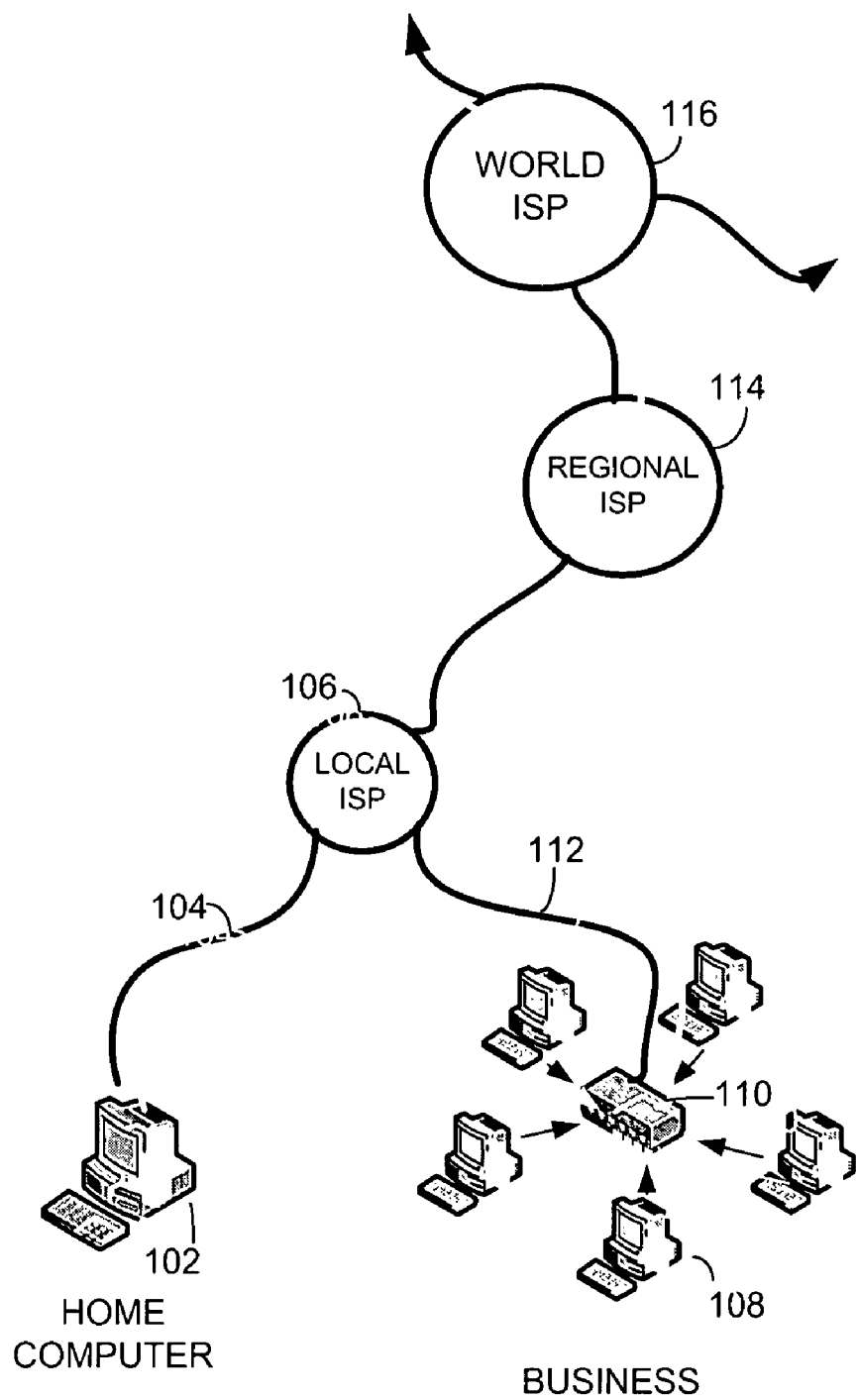
FIG. 1 provides an overview of one possible environment in which network searches, such as Web or Internet searches, are typically carried out.

FIG. 1 provides an overview of an exemplary environment in which network searches such as, for example, exploratory searches, may be carried out. Typically, a user searches for information on a topic on the Internet or on a Local Area Network (LAN) (e.g., inside a business). As such, a brief description of the operating environment of such a search is helpful.

The Internet is a collection of millions of computers linked together and in communication on a computer network. A home computer 102 may be linked to the Internet or Web using a phone line and a modem, a digital subscriber line (DSL), a wireless connection, or a cable modem 104 that talks to an Internet service provider (ISP) 106. A computer in a larger entity such as a business will usually have a network interface card (NIC) that directly connects it to a local area network (LAN) 110 inside the business. The business can then connect its LAN 210 to an ISP 106 using a high-speed phone line like a T1 line 112. ISPs then connect to larger ISPs 114, and the largest ISPs 116 maintain fiber optic "backbones" for an entire nation or region. In this way, every computer on the Internet can be connected to every other computer on the Internet.

The World Wide Web (referred sometimes as the Web herein) is a system of interlinked hypertext documents accessed via the Internet. There are millions of pages of information available on the World Wide Web. When a person conducting a search seeks to find information on a particular subject they typically visit an Internet search engine to find this information on other Web sites via a browser. Although there are differences in the ways different search engines work, they all typically search the Web (or other networks or databases) based on important words, keep an index of the words they find and where they find them, and allow users to query or search for words or combinations of words in that index. Searching through the index to find information involves a user building a search query and submitting it through the search engine via a browser. Text and images on a Web page returned in response to a query can contain hyperlinks to other Web pages at the same or different Web site.

1.2 Exemplary Architecture

Figure 2:
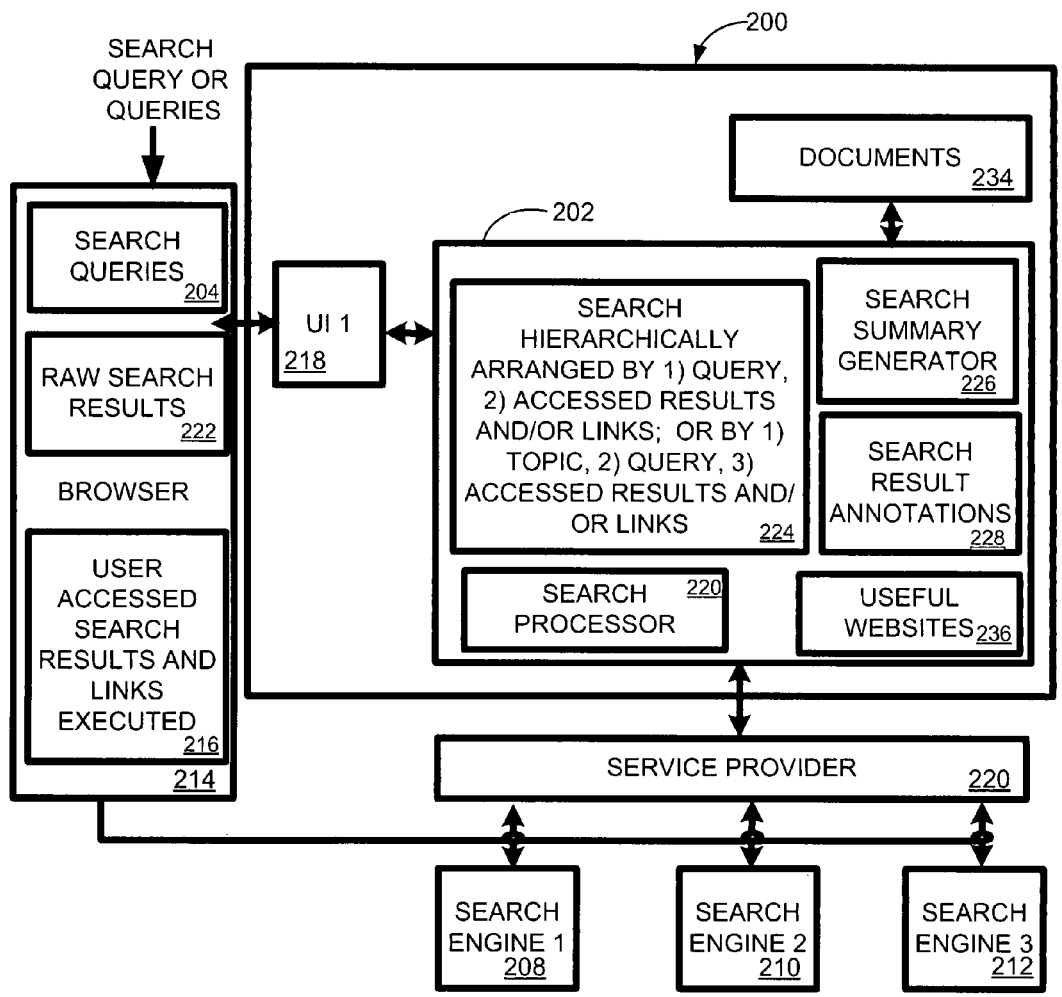
FIG. 2 is a diagram depicting one exemplary architecture in which one embodiment of the search-centric hierarchical browser history technique can be employed.

One exemplary architecture 200 in which the search-centric hierarchical browser history technique can be employed is shown in FIG. 2. A search-centric web browser history module 202 can be employed, which processes search queries 204 that are typically input into a search engine 208, 210, 212 via a browser 214 and resides on a computing device 800, such as discussed with respect to FIG. 8. The Web browser 214 is a software application that enables a user to display and interact with text, images, and other information typically located on a Web page at a Web site on the World Wide Web or other network. Text and images on a Web page can contain hyperlinks to other Web pages at the same or different Web site and a user can access other Web pages by traversing these links.

The Web browser 214 stores the search queries 204 a user enters and the search results that the user accessed and links executed associated with the search queries 216, and maintains a history of the Web sites that the user accessed and the order in which they were visited. The search-centric web browser history module 202 interfaces with a user interface (UI) 218, which interfaces with a browser 214. Searches or queries 204 are executed using the browser 214, one or more search engines 208, 210, 212 and a network service provider 220 which provides access to a network, such as the Internet. The service provider 220 and search engines 208, 210, 212 search data sites (e.g., Web sites on the Internet/World Wide Web) and supply the search results 222 back to the browser 214. In turn, the browser 214 provides each query 204 and search result Web site accessed or linked to 216 to the search-centric web browser history module 202 for further processing. The search-centric web browser history module 202 hierarchically arranges the user accessed search results accessed and links executed 216 by the search queries 204 that provided that search result. In one embodiment, the queries 204 and associated search results accessed 216 can further be organized by search topic in the hierarchical search result module 224. Other processing can also take place such as, for example, automatic preparation of a search summary via a summary module 226 that prepares the summary, or incorporating user annotations stored in an annotation module 228 into the search results. In one embodiment the search-centric web browser history module 202 also maintains a database of Web sites (and their locations) that the user marked as useful in a useful Web site database 236.

The search-centric web browser history module 202 processes the search queries, search results accessed and user actions in a search processor 230 (which performs the computations necessary to arrange the search result histories associated with the search queries hierarchically by specific query, and optionally by topic, using the user accessed search results and links accessed 216 and the search queries 204) and stores them in a hierarchical search results database 224. The user can further request an automated search summary which is output in the form of a document 234, such as a Web page or a word processor document, for example. The user actions are performed using the user interface 218. The search-centric Web browser history module 202 can then also generate documents 234, such as search summaries, using the queries 204 and the hierarchical search queries and results 224.

Figure 3:
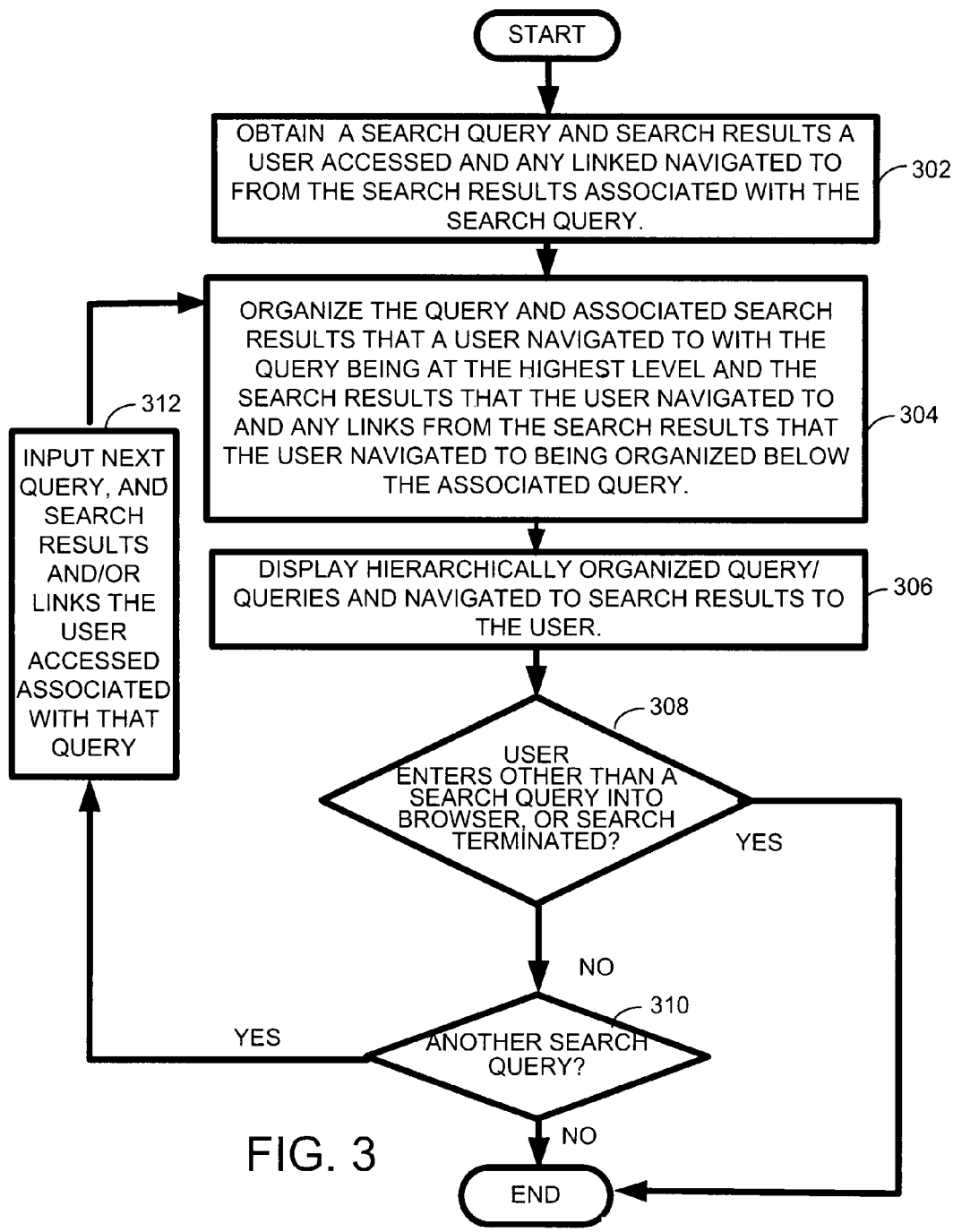
FIG. 3 is a flow diagram depicting a generalized exemplary embodiment of a process employing one embodiment of the search-centric hierarchical browser history technique to organize a user's search history with respect to search queries.

1.3 Exemplary Process Employing the Search-Centric Hierarchical Browser History Technique An exemplary process employing the search-centric hierarchical browser history technique is shown in FIG. 3. In a very general sense, this embodiment of the technique operates as follows. A search query and search results accessed by a user associated with the search query are input (box 302). Typically these are received from the browser. The search results accessed associated with the search query may include Web pages linked to from the search results. In one embodiment, an indicator, named according to the query terms, can be created and correlated to each of the search results and linked to Web sites associated with that query for later display. The first time a given query is executed this query is designated as the top level of the hierarchical arrangement of the search history and the associated search results are stored below it (box 304). If a user visits one of the search results (e.g., Web pages) associated with the query and executes links within that Web page/search result, each Web page linked to is also associated with that query. In one embodiment, each search result (and linked to site) is preferably also designated with an indicator named according to its Web page title. In one embodiment, the search results organized by query are displayed to the user in a hierarchical structure, for example, a tree structure (box 306). In one embodiment, if the user types a new URL into the browser, or otherwise abandons the current query, the technique does not add this data to the search results, nor does it display it (box 308). If the user enters another search query into the browser (box 310), then the next query and associated search results are also hierarchically organized, with the next query being on the same level as the first query and the search results the user accessed being organized under it (boxes 312, 306). In one embodiment if the user re-executes a search query (e.g., by clicking on it), subsequent search results are obtained and hierarchically grouped below the query in the manner discussed above.

Figure 4:
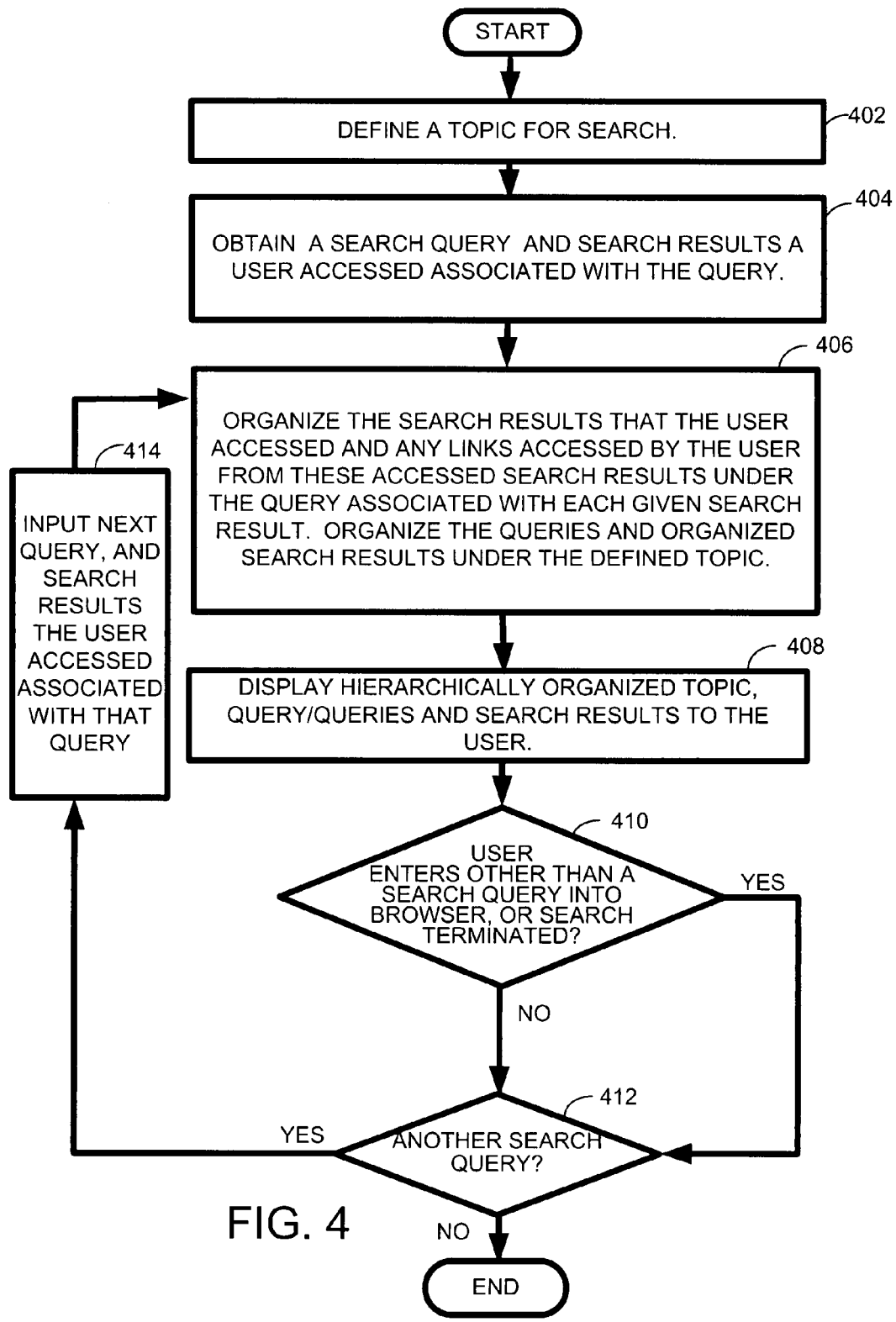
FIG. 4 is a flow diagram depicting another generalized exemplary embodiment of a process employing one embodiment of the search-centric hierarchical browser history technique wherein the topic of an exploratory search is defined.

Another alternate exemplary process employing the search-centric hierarchical browser history technique is shown in FIG. 4. In this embodiment a search topic is defined and designated as the top level of the search-centric web browser history (box 402). This topic can be defined as a default topic or the topic can be specified by a user. This embodiment of the technique then operates as follows. A search query and search results accessed by a user associated with the search query are input (box 404). As in the embodiment discussed with respect to FIG. 3, typically these are received from the browser. The search results accessed associated with the search query may include Web pages linked to from the search results. In one embodiment, an indicator, named according to the query terms, can be created and correlated to each of the search results and linked to Web sites associated with that query. The first time a given query is executed, this query is designated as the second level of the hierarchical arrangement and the associated search results are stored below it (box 406). If a user visits one of the search results (e.g., Web pages) associated with the query and executes links within that Web page/search result, each Web page linked to is also associated with that query. In one embodiment, each search result (and linked to site) is preferably also designated with an indicator, for example, named according to the Web page title. The search results organized by query are displayed to the user in a hierarchical structure (for example a tree) by topic, query and associated user-accessed results (box 406). If the user types a new URL into the browser, or otherwise abandons the current query (box 410), the present technique does not add this data to the search results, nor does it display it. In one embodiment, if the user enters another search query into the browser (box 412), then the next query and associated search results are also hierarchically organized in the hierarchical structure, with the next query being on the same level as the first query and the search results the user accessed being displayed under it (boxes 414, 406, 408).

The search-centric hierarchical browser history technique can prepare search summaries, preferably organized by topic, and incorporate user annotations into the search results.

1.3.1 Defining Exploratory Search Boundaries

The technique provides for various mechanisms for delineating the boundaries of a multi-query search in order to provide search results accessed by a user organized by search query and optionally by search-topic. For example, some embodiments of the technique allow for the user to specify the topic and start of an exploratory search and manually define the end of the search. In one embodiment, the technique assumes an exploratory search is over when the user enters something other than a search query into the browser's search field (for example, a Uniform Resource Locator (URL). Another embodiment of the search-centric hierarchical browser history technique allows a user to define which queries belong to an exploratory search topic retroactively by selecting the search queries and search results accessed by the user, and requesting that they be grouped and hierarchically arranged as a search on a given topic. Yet another embodiment of the search-centric hierarchical browser history technique automatically retroactively determines which queries belong to an exploratory search topic based on parameters in the search queries or in the search results.

1.4 User Interface and Details

Figure 5:
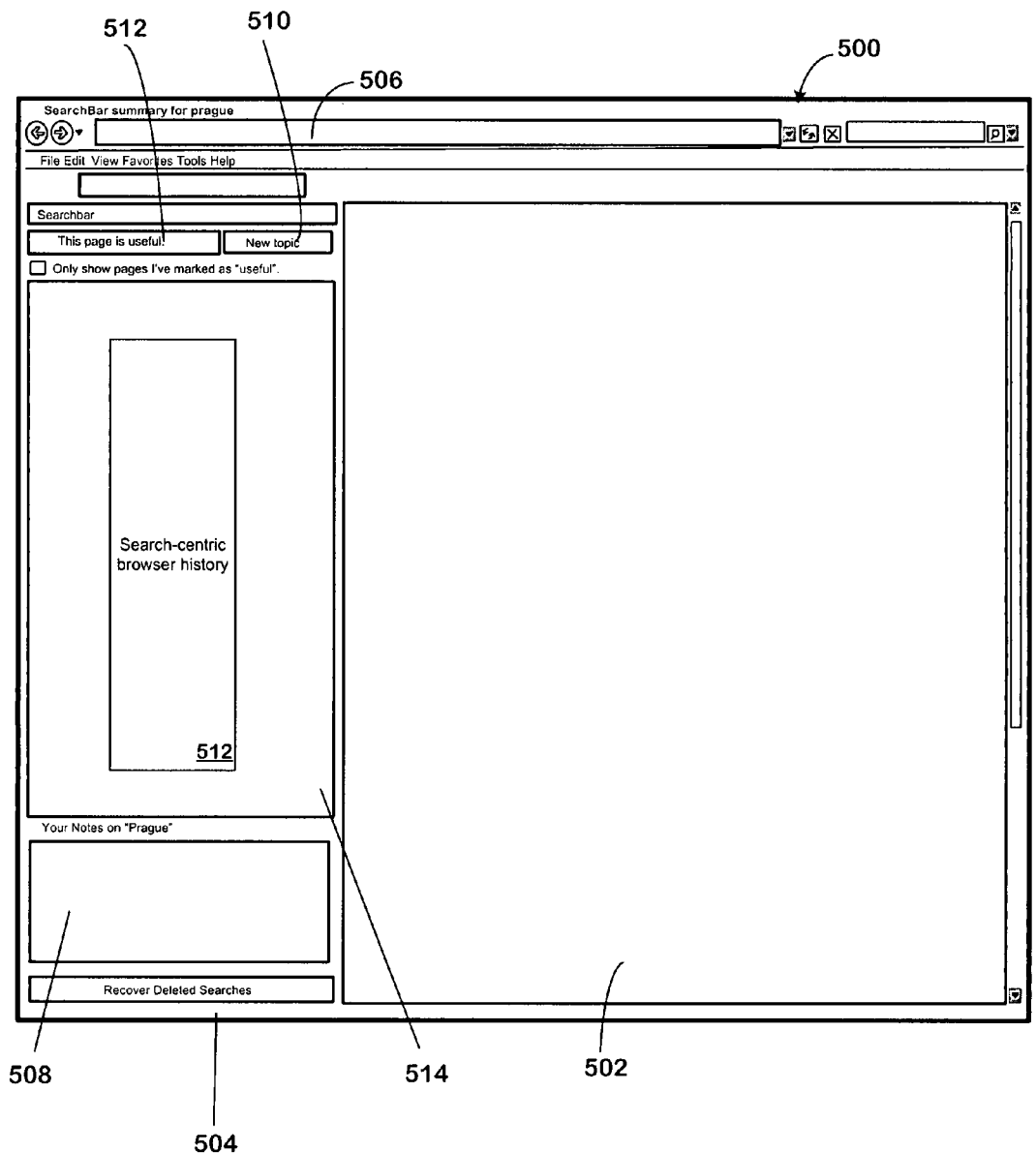
FIG. 5 depicts a general user interface employed in one embodiment of the search-centric hierarchical browser history technique showing both a browser window and a search-centric browser history window.

FIG. 5 provides an exemplary user interface 500 displayed on a computing device's display that is employed in one embodiment of the present search-centric hierarchical browser history technique. In this user interface 500, a typical browser window is displayed 502, as is a search-centric browser history pane 504 that includes a search-centric browser history window 514 and an annotation window 508. This configuration allows a user to view both the user's search history organized by query (and optionally by topic) and Web page content simultaneously. The user interface 500 employs a search query area 506, where a user enters their queries. In one embodiment, the search summary is displayed in the typical browser window 502 whenever a search summary is requested by the user.

The search-centric hierarchical browser history technique can be described in terms of an exemplary embodiment. The search-centric hierarchical browser history technique is, however, not limited to these particular embodiments, parts of which can be used separately or combined in different combinations. The search-centric browser history window 514 displays a search-centric browser history hierarchically organized by query (and optionally by topic), including user-accessed search results. The annotation pane 508 records and displays user entered comments associated with the current search topic. A new topic button control 510 allows a user to define a new topic which also signals the start of a new exploratory search and hierarchical arrangement of subsequent queries and user-accessed results. Various examples of the functionality of various exemplary features of the exemplary interface shown in FIG. 5 are described in the following paragraphs.

1.4.1 New Topic Button

Figure 6:
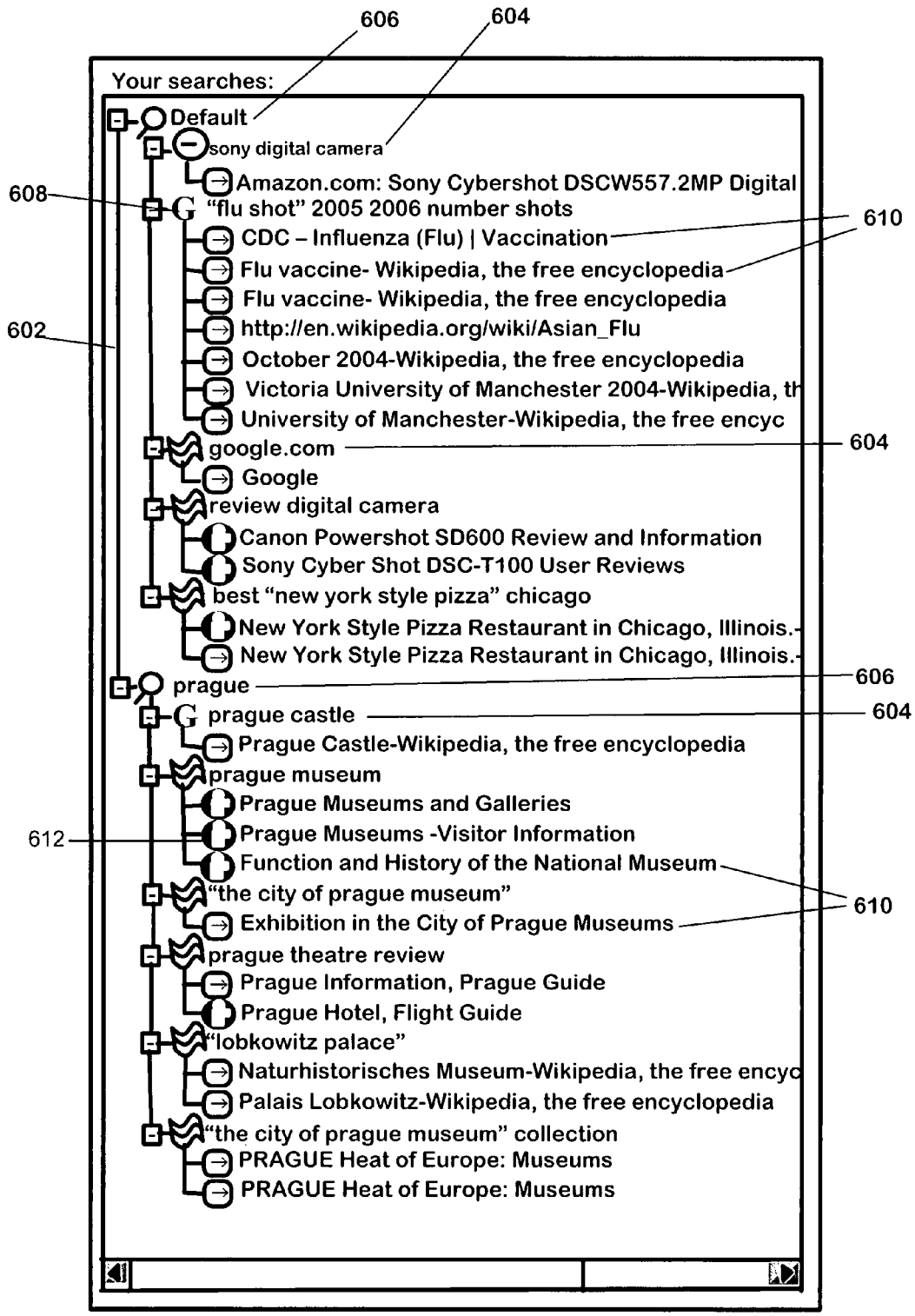
FIG. 6 shows an exemplary search-centric browser history of one exemplary embodiment of the search-centric hierarchical browser history technique.

A user can select the "new topic" control button 510 to create a search topic for an exploratory search. If a topic is defined then this topic can be displayed at the highest level of the search-centric browser history, which in this exemplary embodiment is displayed as a tree, as shown in FIG. 6. Other hierarchical display structures can be employed, however. In this embodiment any queries the user subsequently executes can be automatically associated with this topic. In one embodiment, if the user never creates a new topic, queries are associated with a "default" topic.

1.4.2 Search-Centric Browser History

As mentioned above, an example of a search-centric browser history 602 is shown in FIG. 6. Whenever the user runs a Web search, the query is automatically recognized and a new query element 604 is created in the search-centric browser history 602, associated with the current topic 606. In one embodiment, the query element 604 is named according to the query terms and is assigned a graphical icon 608 indicating the search engine used. In this embodiment, this topic is the top level of the hierarchy, and is easy for the user to browse, since the hierarchy is now literally organized according to the user's own words (since these are the user's search queries).

Whenever the user accesses a search result (a Web page), a new search result element 610 is created in the search-centric browser history 602, associated with the current topic 606 and the current query 604. In one embodiment, this search result element accessed by the user 610 is named according to the Web page title associated with the Web page that the user accessed. Subsequent navigations by clicking on links in this Web page are also associated with this query. In other words, the search-centric browser history 602 maintains information indicating that the user is currently on a "search trail", i.e. the current pattern of navigation originated with a search. This feature allows the user to group a pattern of navigations together, and assigns an intuitive English name to this series of navigations (the query typed in by the user).

1.4.3 End of Exploratory Search/Search Topic

If the user types a new URL into the browser, or otherwise executes something other than a search query, in one embodiment the system does not display this result, as it is not part of a search. This is a very useful feature, as regular visits to new sites, e-mail, etc. can complicate a standard Web history view and are typically not useful to a user who is browsing through his history or trying to re-find a Web page he previously visited. In one embodiment, a "non-search" topic is maintained that stores all results not accessed through a search. This allows these results to be separated from Web pages accessed through a search.

1.4.4 Re-Executing a Query

In one embodiment of the search-centric hierarchical browser history technique, selecting and activating (e.g., clicking on) a previously-issued query automatically reissues that query and provides a new list of search results for the user to access.

1.4.5 Marking/Storing Useful Results

Figure 7:
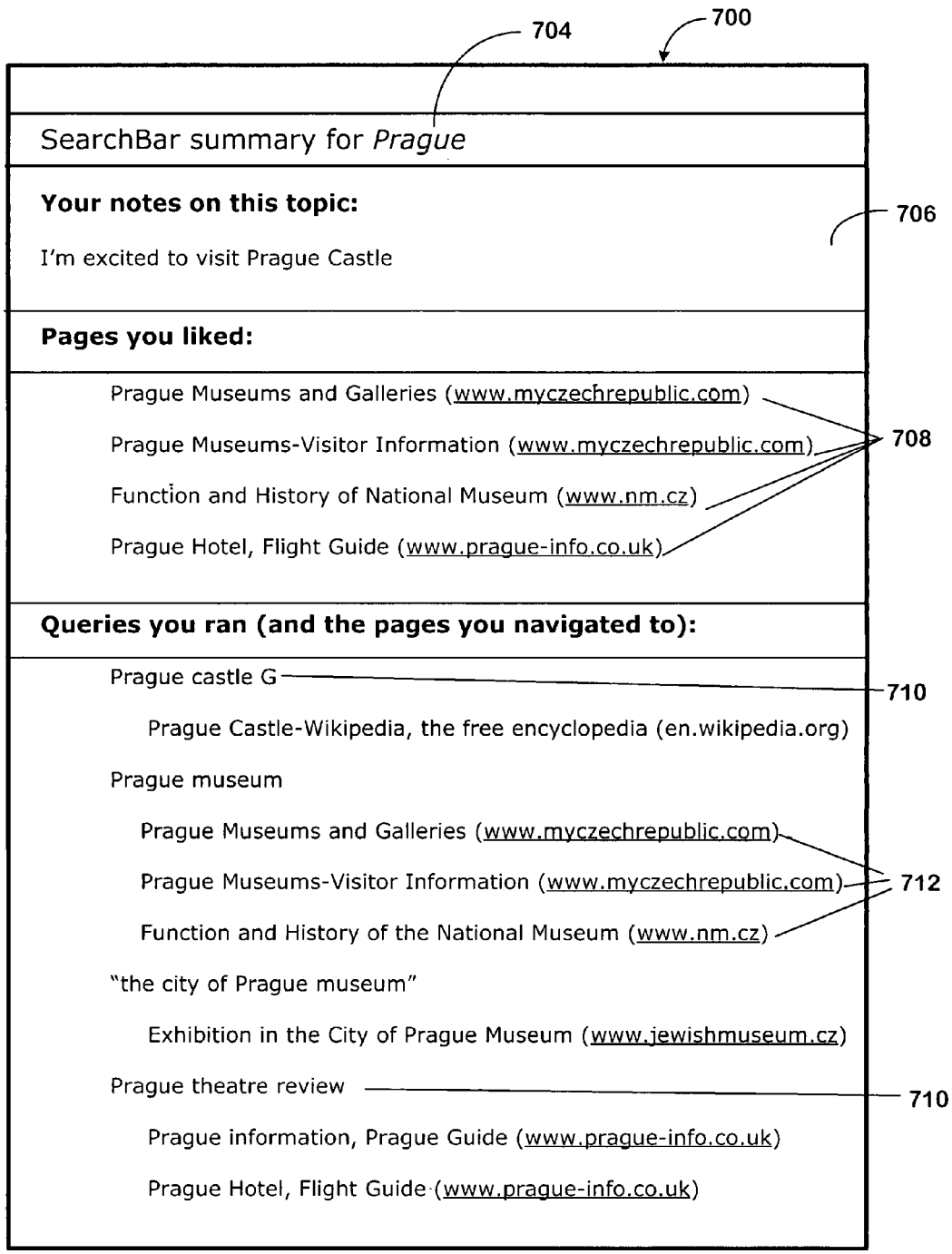
FIG. 7 shows an exemplary search summary that is automatically generated in one exemplary embodiment of the search-centric hierarchical browser history technique.

In one embodiment, the user can mark Web pages as "useful" using the "this page is useful button" 512. This associates a "thumbs up" icon with this page in the search-centric browser history, and also causes this page to appear under the "useful pages" heading in the current topic's summary page, an example of which is shown in FIG. 7. Search results marked as useful can also be identified with a different icon 712 on the search-centric browser history.

1.4.6 Automatic Preparation of Search Summaries

Often the goal of a search is to prepare a summary of results. In one embodiment of the present technique, a summary of an exploratory search for a given topic (particularly the queries used, the results and subsequently-navigated-to-pages and any associated comments) can be exported as document or a Web page. In one embodiment, when the user clicks on a topic in the search-centric browser history, a summary for this topic is automatically displayed in the Web content area. Clicking on the topic in one embodiment, formats all of the results that a user has marked as relevant and puts them in a word processor document (they can also be routed to an e-mail address, Web page, blog, or to other applications). A sample summary 700 is shown in FIG. 7. One embodiment of the summary includes the topic 704, the notes or annotations the user entered about the topic 706, pages the user marked as useful 708, the queries the user entered 710 and the pages the user navigated to and accessed 712.

1.4.7 User-Generated Content

One embodiment of the present search-centric hierarchical browser history technique provides for the ability to add user-generated content. The user can associate text notes with a topic by typing notes into a text field as previously discussed. These notes appear when the current topic is selected, and also appear on the summary page for the current topic.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure. For example, the URLs of the Web sites accessed by a user can be displayed on the search-centric browser history in other than a tree structure as long as they are organized by the associated query. In another embodiment the Web sites that a user accesses by linking instead of selecting a search result returned after entering a query can be organized on a level below the searched results accessed directly in response to the query.

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

2.0 The Computing Environment

The search-centric hierarchical browser history technique is designed to operate in a computing environment. The following description is intended to provide a brief, general description of a suitable computing environment in which the search-centric hierarchical browser history technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 8:
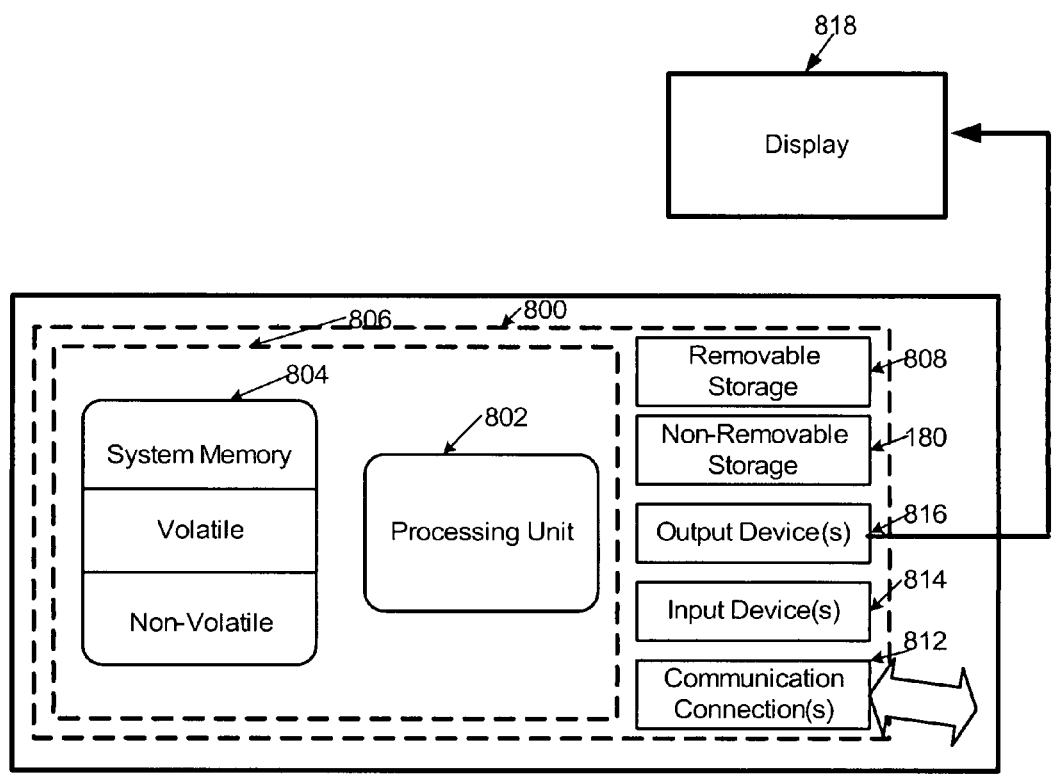
FIG. 8 is a diagram depicting a general purpose computing device constituting an exemplary system for implementing a component of the search-centric hierarchical browser history technique described herein.

FIG. 8 illustrates an example of a suitable computing system environment. The computing system environment is only one example of a suitable computing environment and is not intended to suggest any limitation as to the scope of use or functionality of the present search-centric hierarchical browser history technique. Neither should the computing environment be interpreted as having any dependency or requirement relating to any one or combination of components illustrated in the exemplary operating environment. With reference to FIG. 8, an exemplary system for implementing the present search-centric hierarchical browser history technique includes a computing device, such as computing device 800. In its most basic configuration, computing device 100 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 has a display 818, and may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 may have various input device(s) 814 such as a keyboard, mouse, pen, camera, touch input device, and so on. Output device(s) 816 such as speakers, a printer, and so on may also be included. All of these devices are well known in the art and need not be discussed at length here.

The search-centric hierarchical browser history technique may be described in the general context of computer-executable instructions, such as program modules, being executed by a computing device. Generally, program modules include routines, programs, objects, components, data structures, and so on, that perform particular tasks or implement particular abstract data types. The search-centric hierarchical browser history technique is typically practiced in distributed computing environments where tasks are performed by remote processing devices that are linked through a communications network. In a distributed computing environment, program modules may be located in both local and remote computer storage media including memory storage devices.

Wherefore, what is claimed is:

1. A computer-implemented process for organizing a search-centric history of network searches, comprising:
   receiving a first search topic for a network search;
   receiving two or more search queries associated with the first search topic, search results accessed by a user associated with each search query, and any site accessed from a trail of one or more links originating from within the accessed search results;
   hierarchically organizing the network search by the first search topic at a highest level, each search query of the two or more queries associated with the first search topic at a second highest level, and the search results associated with each search query of the two or more queries that the user accessed and any site accessed from a trail of one or more links originating from within the accessed search results on a third level; and
   automatically simultaneously displaying the hierarchically organized network search of the two or more queries such that the first search topic is displayed at the highest level, each search query of the two or more queries is displayed indented on a separate line at a level below the first search topic, and each search result accessed by a user and any site accessed by the user from a trail of one or more links originating from within the accessed search results is displayed twice indented on a separate line below each associated search query of the two or more queries.

2. The computer-implemented process claim 1 further comprising:
   receiving an additional search topic;
   receiving one or more additional search queries associated with the additional search topic for the network search and additional search results accessed by the user and any site accessed by the user from links within the accessed search results;
   hierarchically organizing the network search by topic at a highest level, each query associated with a search topic at the second highest level below the associated search topic, and the search results associated with each query on a search topic that the user accessed and sites accessed from links within the accessed search results on the third level below the associated query; and
   automatically displaying the hierarchically organized network search.

3. The computer-implemented process of claim 2 wherein the search queries associated with a search topic are conducted using different search engines.

4. The computer-implemented process of claim 1 further comprising receiving the first topic of the network search from a user.

5. The computer-implemented process of claim 4 further comprising a user defining the first topic of the network search by activating a new topic indicator that indicates the start of a new topic for a network search.

6. The computer-implemented process of claim 1 further comprising a user retroactively defining the network search by selecting previously executed search queries associated with the first search topic and search results associated with each of the previously executed search queries.

7. The computer-implemented process of claim 1 further comprising storing and re-executing one or more of the search queries associated with the first search topic at a later time to find new search results.

8. The computer-implemented process of claim 1 further comprising automatically preparing a summary of the network search for the first search topic.

9. The computer-implemented process of claim 1 further comprising associating the user's annotations with the first search topic.

10. A computer-implemented process for organizing search results accessed by a user conducting a search of data available on a computer network, comprising:
    receiving a first search query on a first topic;
    receiving search results accessed by a user associated with the first search query, and sites accessed by the user from links within the accessed search results, associated with the first search query on the first topic;
    receiving a second search query on a first topic;
    receiving search results accessed by a user associated with the first second query, and sites accessed by the user from links within the accessed search results, associated with the second search query on the first topic;
    and
    simultaneously automatically displaying,
      first topic on a separate line at a highest level, the first search query associated with the first topic indented on a separate line below the first search topic and search results accessed by the user associated with the first search query and sites accessed by the user from the links within the accessed search results on a separate line indented below the associated first search query that returned the search results; and
      the second search query associated with the first topic indented on a separate line below the first search topic, and search results accessed by the user associated with the second search query and sites accessed by the user from the links within the accessed search results on a separate line indented below the second search query.

11. The computer-implemented process of claim 10, further comprising:
receiving an additional topic;
receiving one or more additional search queries associated with the additional topic and search results accessed by the user associated with the one or more additional search queries associated with the additional topic; and
simultaneously displaying the first and additional topic at the highest level on separate lines, each search query associated with the each topic at the second highest level below the associated topic indented on a separate line and the search results associated with each search query that the user accessed and sites the user accessed from within the accessed search results on the lowest level below the associated search query indented and on a separate line.

12. A method for organizing and displaying search queries and associated search result histories on a computer display, comprising:
receiving multiple search queries related to more than one topic being searched from a user and multiple search results associated with each of the multiple search queries accessed by a user and sites accessed by the user via a trail of links within the accessed search results;
automatically, without user action, displaying on the computer display in a hierarchically organized manner each of the more than one search topic at the highest level, each search query of the multiple search queries associated with a search topic indented on a separate line on the second level below the associated topic, and the search results associated with each search query that the user accessed and each site accessed by the user via a trail of links originating from within the accessed search results indented on a separate line below the associated search query that returned the search results.

13. The method of claim 12 wherein more than one search query is received from different search engines that are used to conduct the more than one search query.

14. The method of claim 13 further comprising displaying an indicator associated with the name of the search engine used to perform the search query next to each search query.

15. The method of claim 12 further comprising displaying a name of the query next to each query, wherein the name of the query is based on search terms used to create the query.

16. The method of claim 12 further comprising displaying a name of each search result accessed by the user next to the search result displayed.

17. The method of claim 12 further comprising naming each search result accessed by the user with a name of a web site associated with the search result accessed by the user.

18. The method of claim 12 further comprising simultaneously displaying a search summary to the user wherein the search summary comprises a topic, each search query associated with a topic and the search results associated with each search query that the user accessed and sites accessed by the user via a trail of links from within the accessed search results.

19. The method of claim 12 further comprising the user annotating notes related to the topic which are displayed on the computer display.

* * * * *

UNITED STATES PATENT AND TRADEMARK OFFICE
CERTIFICATE OF CORRECTION

PATENT NO.        : 8,090,740 B2                                           Page 1 of 1
APPLICATION NO.   : 11/974725
DATED             : January 3, 2012
INVENTOR(S)       : Daniel S. Morris et al.

It is certified that error appears in the above-identified patent and that said Letters Patent is hereby corrected as shown below:

Title page, item (54), under "Title" column 1, line 1, delete "HIERARCHICHAL" and insert -- HIERARCHICAL --, therefor.

In column 1, line 1, delete "HIERARCHICHAL" and insert -- HIERARCHICAL --, therefor.

In column 10, line 58, in Claim 10, before "first topic" insert -- the --.

In column 10, line 60, in Claim 10, after "topic" insert -- , --.

Signed and Sealed this
Twenty-eighth Day of February, 2012

David J. Kappos
*Director of the United States Patent and Trademark Office*